United States Patent [19]

Meuschke et al.

[11] 4,200,172
[45] Apr. 29, 1980

[54] RADIATION SHIELDED MOVABLE WORK STATION APPARATUS

[75] Inventors: Robert E. Meuschke, Pittsburgh; Harry N. Andrews, Murrysville Boro; Anthony A. Massaro, Jr., Export, all of Pa.

[73] Assignee: Westinghouse Electric Corp., Pittsburgh, Pa.

[21] Appl. No.: 896,531

[22] Filed: Apr. 14, 1978

[51] Int. Cl.² .................... E04G 23/02; G21F 1/00; G21F 7/00
[52] U.S. Cl. .................... 182/46; 182/128; 182/142; 250/517
[58] Field of Search .......... 182/128, 150, 47, 46, 182/36, 37, 142; 109/1 S; 250/517; 52/169.6; 176/DIG. 2

[56] References Cited

U.S. PATENT DOCUMENTS

| | | | |
|---|---|---|---|
| 3,090,740 | 5/1963 | Huston | 250/517 |
| 3,454,133 | 7/1969 | Gregord | 182/128 |
| 3,955,685 | 5/1976 | Smith | 182/128 |
| 3,994,365 | 11/1976 | Petermann | 182/128 |
| 4,058,184 | 11/1977 | Stuart | 182/128 |
| 4,120,378 | 10/1978 | Mills | 182/128 |

*Primary Examiner*—Reinaldo P. Machado
*Attorney, Agent, or Firm*—D. C. Abeles

[57] ABSTRACT

Described is a movable work station apparatus including travelling-hoist supported tools and a vertically and rotarywise movable frame-carried radiation-shielded enclosure, or gondola, for working personnel involved in tube-bundle-replacement tasks performed within the shell of a steam generator in a nuclear plant. The enclosure, or gondola, is divided and accommodates four upright workers in mutually-facing pairs at opposite sides of a work-accommodating clearanceway observable and accessible from the gondola interior via lead glass windows and hand holes.

6 Claims, 7 Drawing Figures

4,200,172

RADIATION SHIELDED MOVABLE WORK STATION APPARATUS

CROSS-REFERENCE TO RELATED APPLICATIONS

Commonly assigned U.S. Application Serial No. 809,588 filed June 24, 1977.

BACKGROUND OF THE INVENTION

This invention relates to apparatus for effecting retubing of a steam generator in a nuclear power plant.

Nuclear reactor power plants utilize a steam generator having a tube bundle to transfer heat from a primary-side reactor-heated-liquid to water on a secondary side to form steam for driving a turbine. Condenser leaks in the power plants have caused circulating water, which is often brackish, to mix with the secondary-side water in the steam generator, resulting in the build-up of undesirable chemicals in the tube bundle. Water treatment and blowdown have not completely protected the steam generator tubes from corrosion and leaks. As the number of tubes subject to such leaks increases, the desirability of replacement or repair of the steam generator increases. Since removal of a steam generator in its entirety from a nuclear power plant requires tearing out a large portion of a reinforced concrete containment vessel, replacement of such generator in toto becomes time consuming, expensive, and therefore undesirable.

SUMMARY OF THE INVENTION

The present invention is related in general to the replacement of the tube bundle in a steam generator in a nuclear power plant and more particularly to a work station apparatus movable within the shell of such steam generator to transport and radiation-protect workers during execution of certain operational stages involved in the tube bundle replacement. In its preferred form as presently contemplated such work station apparatus includes a vertically transportable support frame in which is disposed a removable enclosure or gondola assembly that is constructed and arranged to accommodate four construction workers in an upright attitude in pairs at opposite sides of a vertical clearanceway observable from the interior of the housing through the medium of lead glass windows and accessible for work performance by hand holes in the enclosure. In general, the workpiece objects to which the work effort is to be directed will be located immediately beneath the vertical clearanceway and the enclosure assembly is so constructed that the workers therein remain in a vertical and upright attitude during their performance of work tasks, thereby maximizing the distance between the workpiece objects which may be slightly radioactive and the more vulnerable regions of the workers anatomy. To assist the workers in the performance of the tasks to be performed beneath the clearanceway a plurality of hoists on overhead carriages and cross-carriages are provided in the upper region of the clearanceway supported on suitable cross members for raising and lowering various tools used in the clearanceway. All of the foregoing components are in turn carried on a main support frame suspended from an overhead crane mounted atop a pedestal assembly resting on an upper open end of the steam generator shell and made accessible for such mounting by cutaway of a cover portion of the steam generator shell in a previously conducted preliminary step involved in the overall retubing operation. When disposed in lowered work position, the frame-supported shielded working enclosure assembly is adapted to be turned about a central axis of the steam generator shell by virtue of suspension of such assembly by a rotary swivel and use of an array of wheels which may be effectuated to be brought into rolling engagement with the inner wall of the steam generator shell and operated manually to effect such a turning movement as may be desired.

Still other features and advantages of the invention will become apparent from subsequent and more detailed description of the invention when taken in connection with the accompanying drawings in which.

DESCRIPTION OF THE PREFERRED EMBODIMENT

Figure 1:
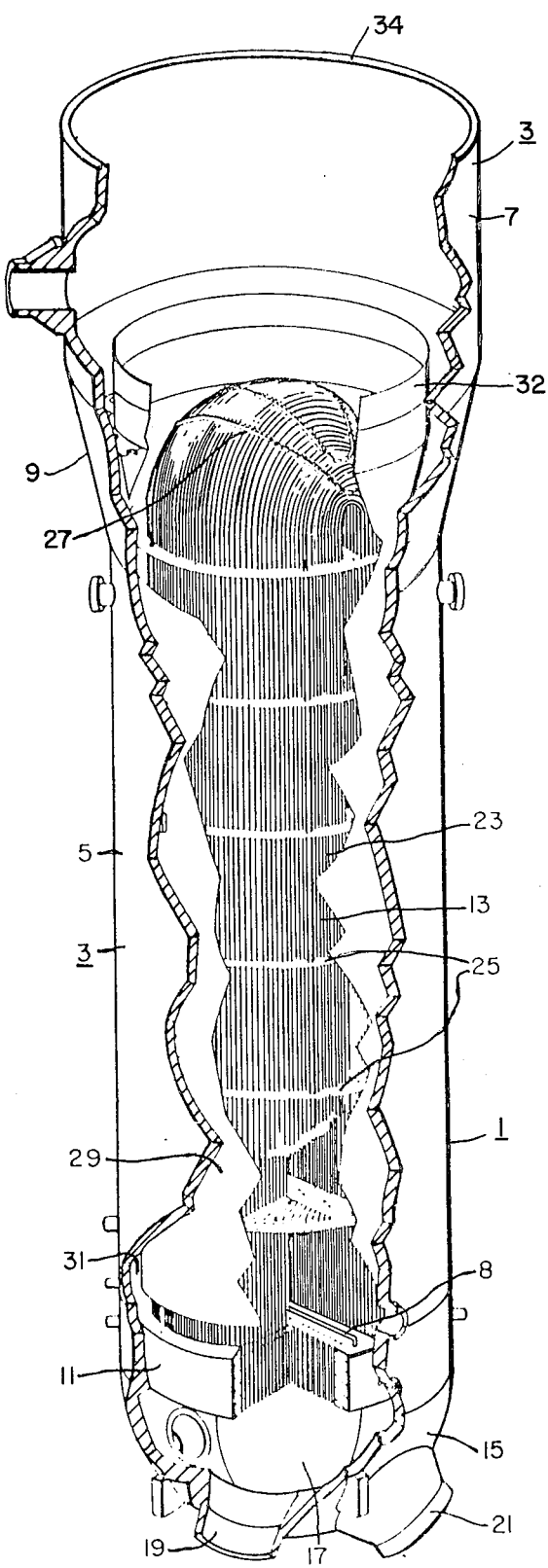
FIG. 1 is a vertical perspective view of the tube-containing portion of a nuclear power plant steam generator shown partially in section.

Referring to FIG. 1 in the drawings the steam generator 1 with which the movable work station apparatus of the present invention is intended to be employed for replacement of the tube bundle 23 therein typically includes a vertically oriented shell 3, the shell comprising a lower cylindrical portion 5 and an upper cylindrical portion 7, larger in diameter than the lower portion 5 and a frustoconical transition portion 9 joining the lower and upper portions 5 and 7. A tube sheet 11 is disposed in the lower end of the lower portion 5 of the shell and has a plurality of holes for accommodating the ends of U-shaped tubes 13 which extend upwardly from the tube sheet 11 and are closely packed to form the tube bundle 23 disposed vertically within the lower portion 5 of the shell 3.

A hemispherical channel head 15 is fastened to the tube sheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle 23 to support the tubes 13 at various locations along their length to reduce flow-induced vibrations. Anti-vibration bars 27 are also disposed adjacent to the bends in the tubes 13 to prevent vibration in this portion of the tube bundle 23.

A wrapper or sleeve 29 is disposed between the tube bundle 23 and the shell 3 so as to form an annular space 31 therebetween. The upper part of the upper section 7 of the shell has been removed to gain access to the interior of the steam generator in preparation for removal and replacement of the tube bundle therein. Various components of the steam generator usually disposed in the upper section 7 of the shell 3 also have been removed from the steam generator as shown in FIG. 1 to provide access to the top of the sleeve 29 encircling the tube bundle 23. The upper circular edge 34 of the upper portion 7 of the shell 3 will be smooth and even and rather precisely defined and will lie in a horizontal plane by virtue of a rather careful previous grinding, cutting or machining operations previously referred to as preparatory to in situ tube bundle replacement.

Typical operation of the steam generator, which per se forms no part of the present invention, involves the flow of heated primary fluid from a nuclear reactor core upwardly through the tube sheet 11 and one branch of the U-shaped tube bundle 23 and downwardly through the other branch of such tube bundle and back through the tube sheet 11 to the discharge nozzle 21, while secondary fluid above the tube sheet 11 and outside the tube bundle 23 becomes heated for forming steam for conveyance by conduit means (not shown) to a turbine (not shown) operated by such steam.

Referring to FIGS. 2, 3, 4 and 5 in the drawing, the present invention comprises an enclosure assembly including a pair of radiation-shielded worker enclosures 40 each of which is adapted to accommodate two workers (not shown) standing in upright attitudes. Each of the shielded enclosures 40 has wall portions made of relatively thick steel plate joined together as by weldments (not shown) and includes four separate sections, two upper sections 4OU1 and 4OU2 and two lower sections 4OL1 and 4OL2 to facilitate set-up and knockdown of the enclosure when desired. The vertical walls of the enclosures 40 may be in the order of several inches thick, with a bottom wall of about four inches thick, for example, and a top cover member 41 of something like a half inch thick or less, for example. Total height of each enclosure may be in the order of slightly less than eight feet, which affords ample height within the interior of the enclosure to accommodate the workers therein in their standing attitude, even while wearing hard hats as the case might be.

Figure 5:
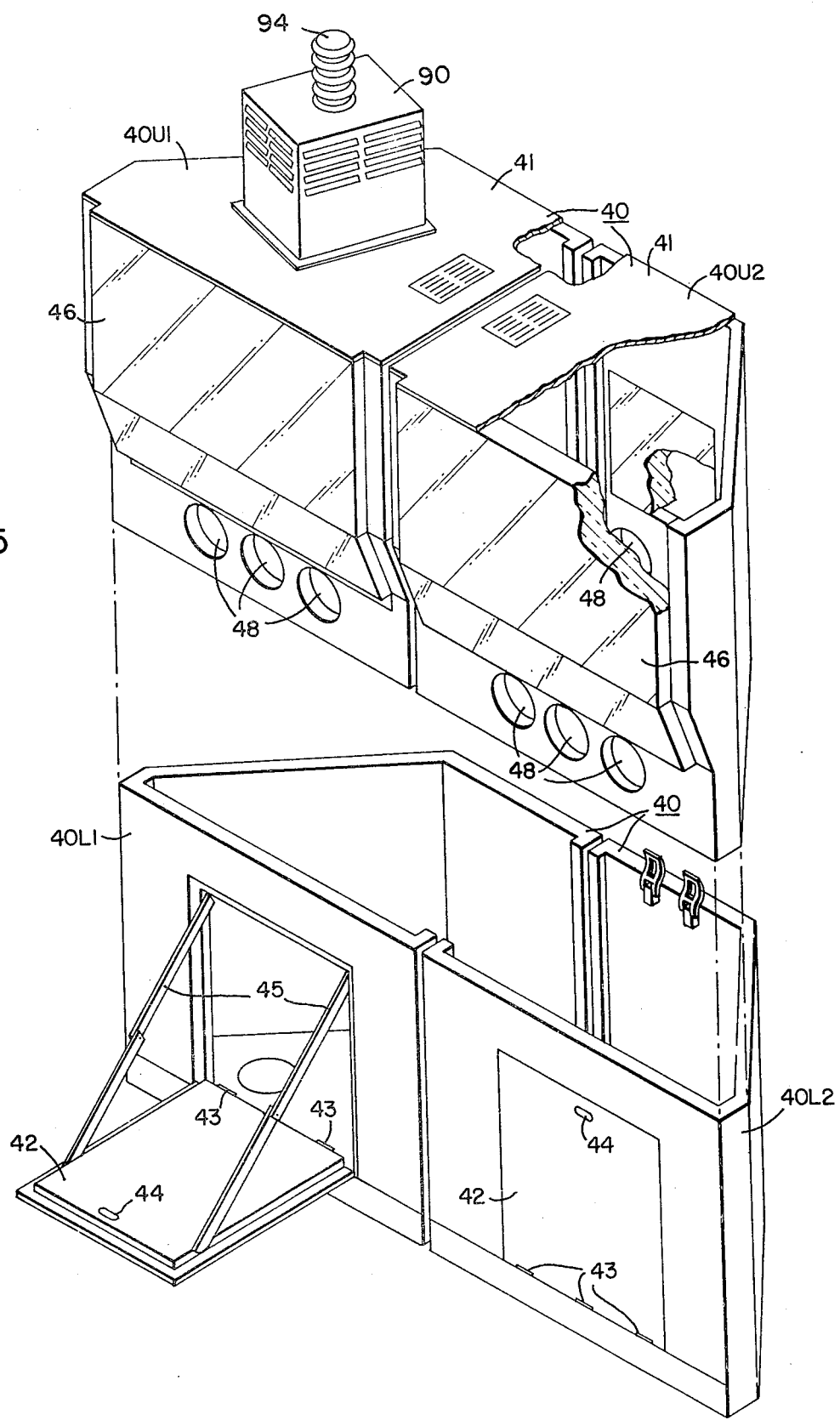
FIG. 5 is a perspective view in elevation showing details of a shielded enclosure embodied in the apparatus of the present invention.

Each lower section 4OL1 and 4OL2 of the enclosures 40 is provided with a bottom-hinged sheet steel door 42 of flanged-edge construction suitably proportioned to permit the workers to enter and leave via entranceways in the forward walls of such enclosure sections in open, lowered, positions of the doors as shown in the lower lefthand portion of FIG. 5 affiliated with the enclosure section 4OL1. This is arrived at by providing hinges 43 at the lower horizontal edges of the doors 42 and provision of a manually operable latch 44 at the upper edge of the door for securing same when closed. Hinged retractable support arms 45 hold such worker entrance doors 42 in a horizontal attitude when opened. The front of each of the upper enclosure sections 4OU1 and 4OU2 is provided with a thick lead glass window 46 arranged to extend horizontally outward beyond the location of the forward vertical face of the lower housing section 4OL1, 4OL2 and which has an inwardly extending lower portion constructed and arranged to afford a downwardly-aimed view to working personnel within such enclosure. Relatively thick lead glass windows 47 are provided also in the rear walls of upper enclosure sections 4OU1 and 4OU2 to afford additional observation locations to personnel within the enclosures 40. Hand holes 48 are provided in the upper housing or upper enclosure sections 4OU1 and 4OU2 beneath the observation windows 46 and 47 at front and rear to enable tools (not shown), for example, located outside the enclosure to be manipulated by working personnel standing within such enclosures. The front of each enclosure 40 is wider than the rear and its side walls taper inwardly from front to rear to provide a configuration that nests conveniently adjacent to the inner surface of the lower section 5 of the shell 3 of the steam generator 1 in absence of the tube bundle 23 being replaced.

Figure 4:
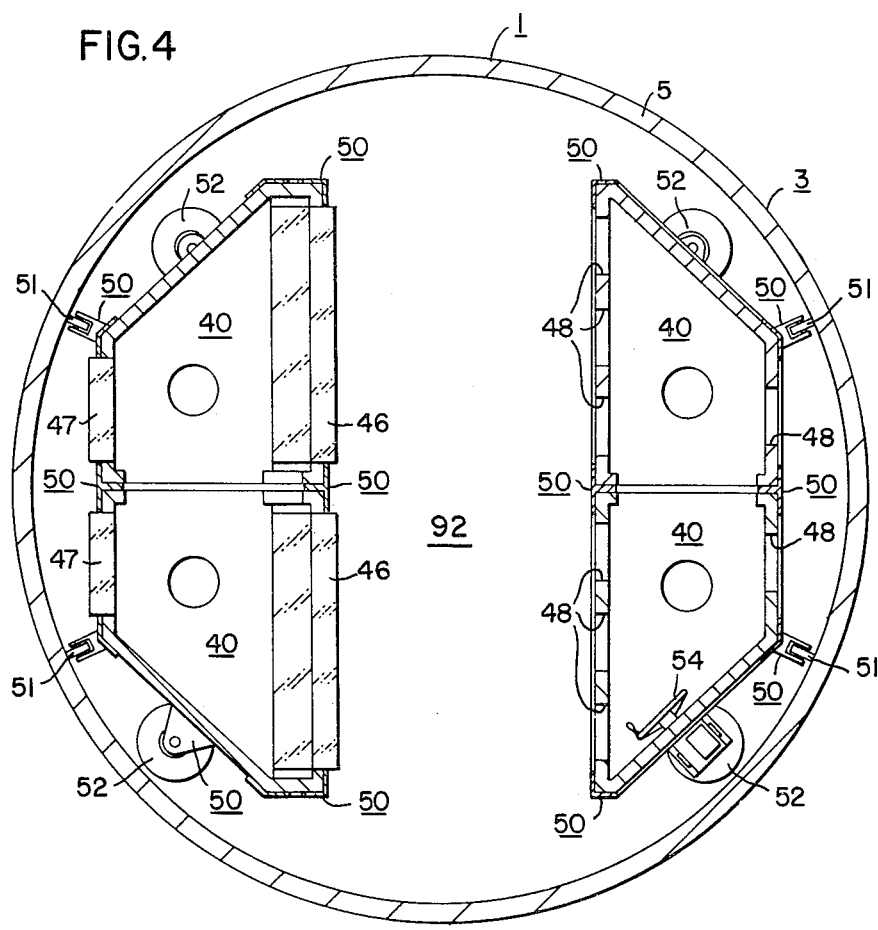
FIG. 4 is a section view taken along the line IV—IV in FIG. 2.

The upper and lower sections of the shielded enclosures 40 are removable supported in support cage assemblies 50 made up of horizontal and vertical angle arm members welded together. Vertical guide rollers 51 are carried at the bottom of the support cage assemblies 50 at the rear of the working personnel enclosures 40 for vertical guiding cooperation with the inner wall of the lower section 5 of the shell 3 of the steam generator 1 while such assembly is being transported vertically through the interior of such shell section as during transport within the generator shell to and from a work site. The working enclosures 40 are so proportioned that when they are disposed within the interior of the lower section 5 of the steam generator shell 3 as shown in FIG. 4, for example, they provide a vertical clearanceway 92 therebetween; such clearanceway affording a pathway for disposition, travel, and manipulation of tools (not shown) and/or workpiece parts (not shown) being manipulated or worked on. The support cage assemblies 50 for the two shielded personnel enclosures 40 are mechanically connected through the medium of a supporting structure to be described subsequently.

Figure 6:
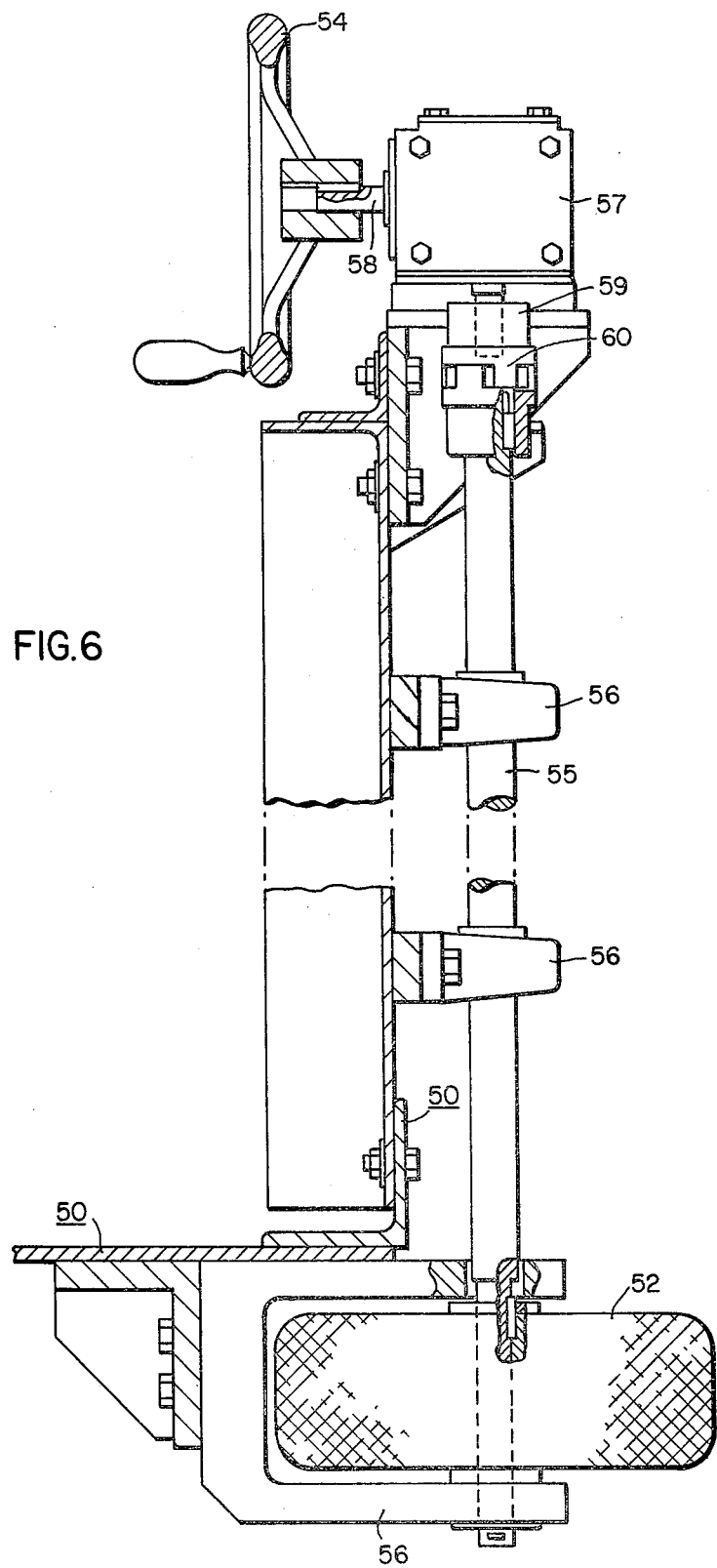
FIG. 6 is an elevation view, partly in outline and partly in section showing a manually operable means for effecting turning movement of the shielded work station apparatus of the present invention when disposed within the shell of the steam generator.

The bottom portions of such support cage assemblies include a plurality of rubber tired wheels 52 constructed and arranged for circumferential rolling engagement with the inner surface of the lower shell section 5 of the steam generator 1 relative to turning movement about the central axis of such shell section. One of such wheels 52 affiliated with each enclosure 40 assembly is actuable by a pneumatic cylinder means (not shown) to a retracted position disposed out of engagement with the inner shell wall to prevent interference with vertical movement when desired. In addition, one of the wheels 52, in accord with the showing in FIGS. 4 and 6 is turnable manually by a hand wheel 54 from the interior of one of the enclosures 40 to effect turning movement of the interconnected enclosure 40 when desired. The operating mechanism for effecting such a turning movement of the one rubber tired wheel 52 is affiliated with a support frame 50 for the one enclosure 40 and includes for example a rotary shaft 55 secured to the wheel 52 to turn therewith, a number of brackets 56 for support of the wheel and for guiding turning movement of the drive shaft 55. A right-angle gear drive mechanism 57 has a drive input shaft 58 connected to the hand wheel 54 and an output shaft 59 joined by a suitable coupling 60 to the upper end of the drive shaft 55. The shaft 58 connected to the hand wheel 54 will pass through a side wall of the respective enclosure 40.

An air conditioning unit 90 with intake filter 92 is provided each one of the personnel enclosures 40 mounted on the top cover member 41 thereof for comfort and safety of the personnel therein.

Each of the personnel enclosures 40 is joined to an overhead horizontal support frame assembly 65 through the medium of respective vertical interconnecting frame means 66. The horizontal support frame assembly 65 includes a pair of I-beam members 67 extending above the enclosures 40 across the clearanceway 92 therebetween. Opposite ends of the I-beam members 67 are removably attached to the tops of the interconnect frame means 66 by means of plates 68 and bolts 69. A pair of cross carriage tracks 70 of I-beam construction are welded to the underside of the I-beam members 67 and extend widthwise of the enclosures 40 at opposite sides of the upper end of the clearanceway 92. A plurality of cross carriages 71, four being shown in FIG. 3 for example, are arranged for movement widthwise of the enclosures 40 along the tracks 70 through the medium of rollers 72 supported by brackets welded to the upper edge of the cross-carriage beams 71 at their opposite ends. Each of the cross-carriages 71 carries a power operated hoist 73 suspended from a respective trolley 74 roller-supported on the lower flange of the cross carriage beam 71; one such hoist 73 being shown in FIG. 2 and one such hoist being shown in FIG. 3.

Figure 7:
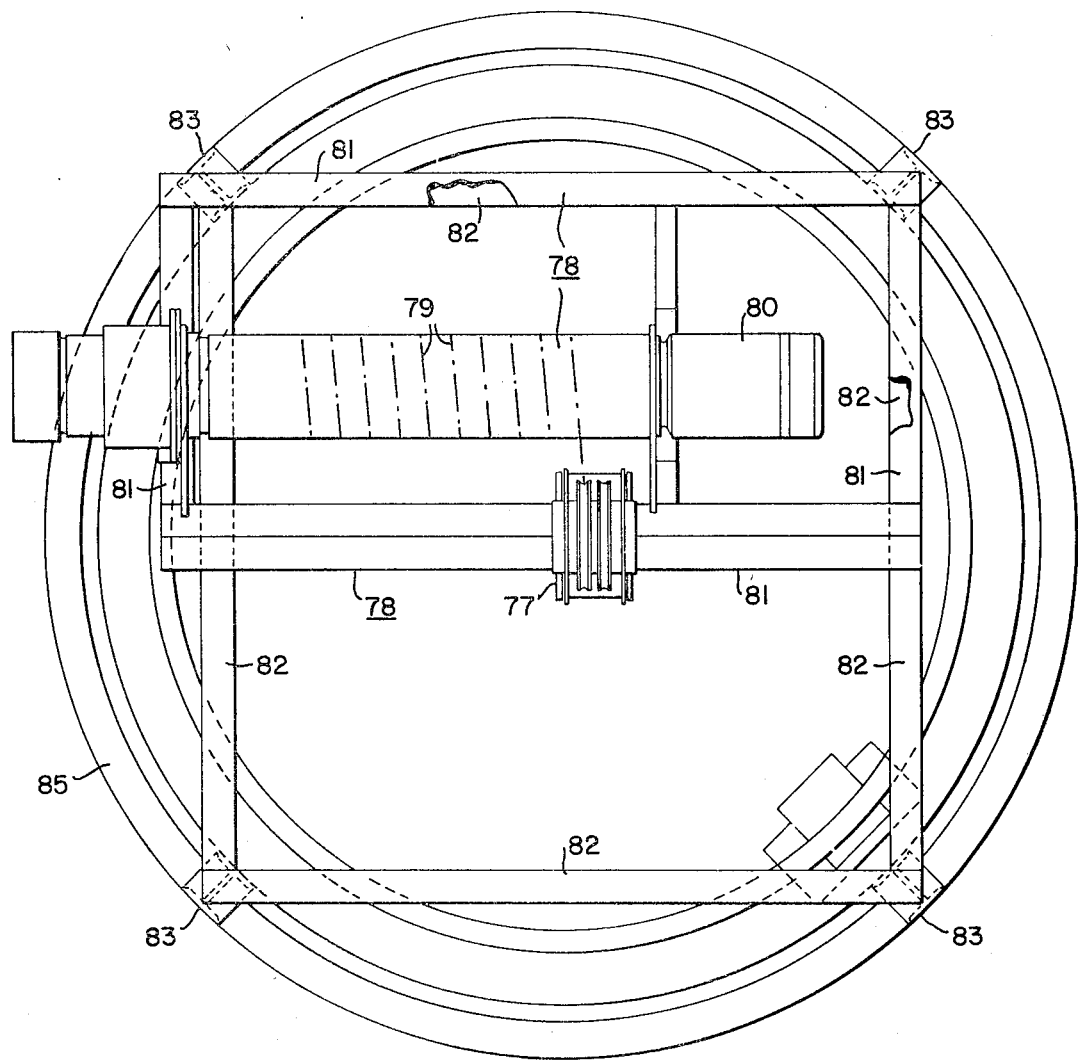
FIG. 7 is an elevation view, partly in outline, showing the crane assembly and upper support frame of this invention.

The entire assembly including the personnel enclosures 40, support cages 50, vertical interconnect frames 66, and horizontal support frame 65, including the cross carriage tracks 71, hoist 73, etc. is supported for vertical and rotary movement about the central axis of the steam generator shell 3 on a swivel hook 75 at the lower end of a travelling block 76. The block 76 is supported by multiple cable loops 77a from a sheave 77 forming part of a crane assembly 78 that includes a cable drum 79 and members 81 forming a rectangular frame supporting such sheave 77, motor 80, and cable drum 79 for proper payout and reel-in of the cable to and from the sheave 77 for raising and lowering the travelling block 76 and the load supported thereby on the swivel hook 75 as shown in FIGS. 5 and 7. The crane assembly 78 in turn is supported on a rectangular frame made up of horizontal I-beam members 82 welded together at their corners and supported at such corners by vertical I-beam columns 83 secured to and extending upwardly from a support ring 85 which in turn finds support from mounting bracket assemblies 86 disposed immediately beneath the columns 83 and carried on the upper rim edge 34 of the upper portions 7 of the steam generator shell 3.

The height of the columns 83 are such that when the crane assembly 78 is in its fully raised position, that is when the travelling block 76 and swivel hook 75 are in their uppermost position, the personnel enclosures 40 will occupy their rest position adjacent to the upper shoulder 34 of the upper section 7 of the generator shell 3, with the lowermost ends of the enclosures at a height in which they would be disposed slightly above any tube bundle 23 that might be in place within the generator. Thus the enclosures 40 may be employed by working personnel to assist in removal of securing paraphernalia, if desired. Otherwise, such tube bundle 23 will be absent, following its removal for replacement by a new tube bundle means (not shown) and the working personnel enclosures 40 may be lowered by operation of the crane assembly 78 to a position within the lower portion 5 of the generator shell 3, in which position they are shown in dot-dash outline in FIG. 2, for a working relationship with the top of the tube sheet 11, FIG. 1, and which may involve the removal of tube stubs (not shown) remaining from a previous tube bundle removal operation. Tools (not shown) suspended from the hoists 73 may be manipulated by the working personnel standing within the enclosures 40 via the hand holes 48 beneath the windows 46 to assist in performance of the work tasks.

Figure 2:
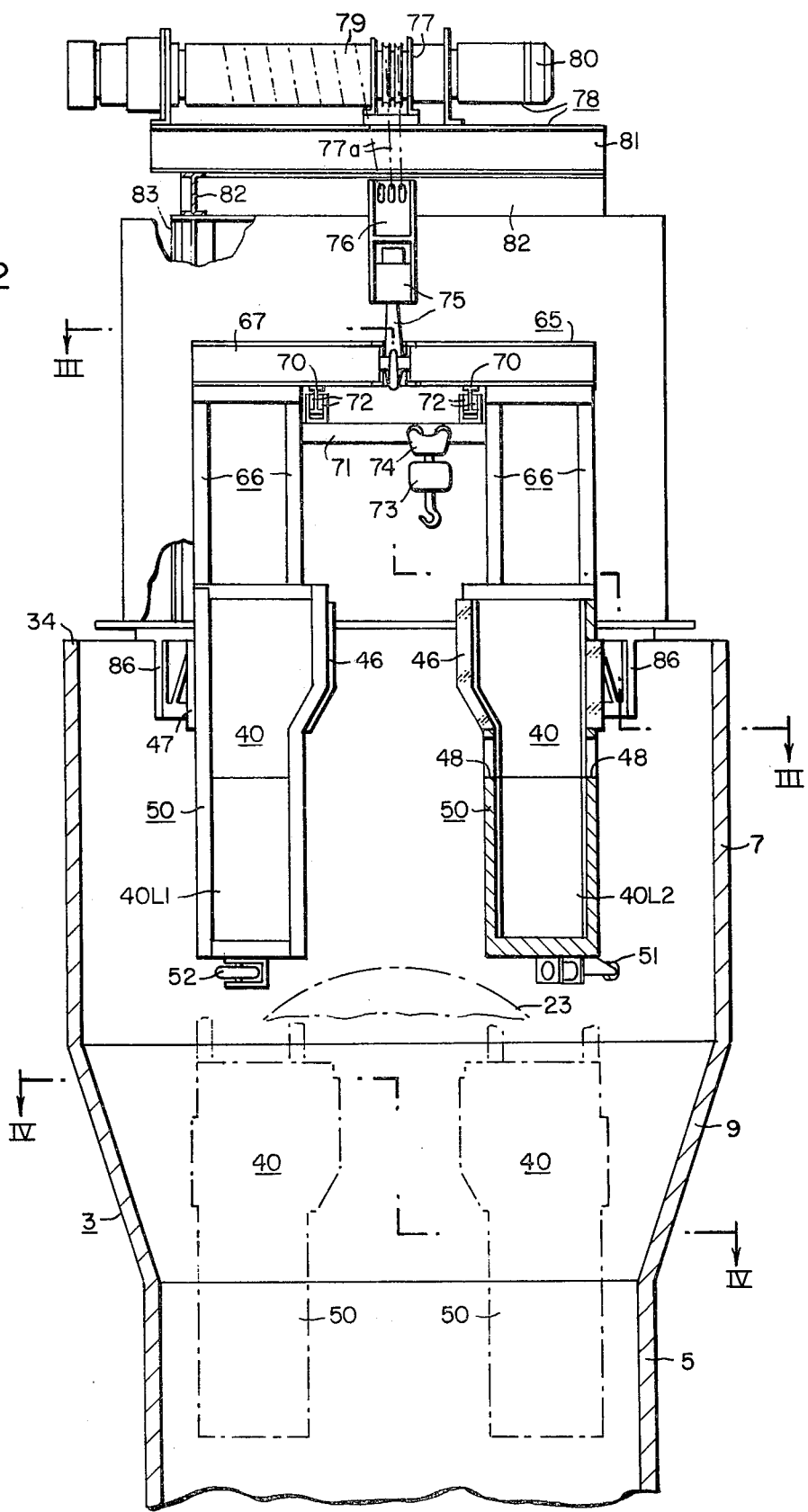
FIG. 2 is a vertical view partly in outline and partly in section showing a preferred embodiment of the present invention affiliated with the shell of a steam generator such as shown in FIG. 1 from which the tube bundle depicted in such Figure has been removed.
Figure 3:
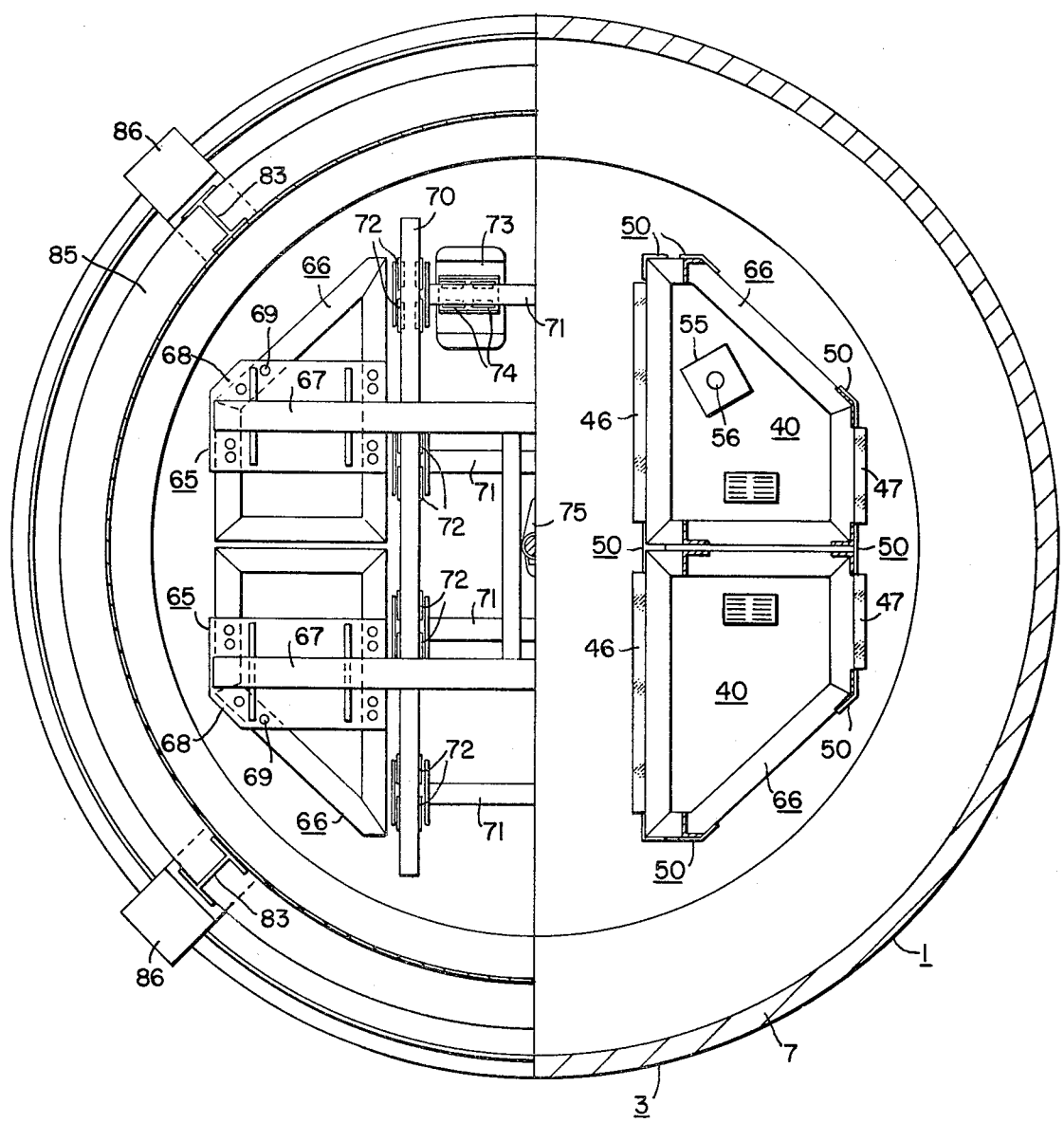
FIG. 3 is a section view taken along the line III—III in FIG. 2.

Following completion of all work tasks to be performed at the tube sheet site by use of the apparatus of the present invention, the enclosures 40 may be returned to their uppermost repose positions in which they are shown in solid outline in FIG. 2 and the entire assembly may be removed from the upper rim 34 of the upper shell section 7 by use of a radius crane (not shown) permanently located within the containment (not shown) at the reactor power site of the generator undergoing repair. Such raising of the gondola or enclosure assembly by the radius crane can be effectuated by use of such as a suitable cable sling and eye bolts (not shown) affiliated for example, with the mounting frame members 82 atop the columns 83. The entire assembly will then be raised upwardly away from the mounting pads 86 disposed on the upper rim 34 of the upper shell section 7 and then displaced laterally and lowered onto extended sections (not shown) of the columns 83 to maintain the shielded personnel enclosures 40 in suspension from the swivel hook 75.

Having now described the invention what is claimed as new and desired to be secured by Letters Patent is:

1. Work station apparatus for use in an opened-top steam generator shell of a nuclear power plant,
    radiation shielded enclosure means for working personnel, having radiation-protective glass windows and holes for observation and manipulation of tools,
    swivel means suspending said enclosure means with freedom for turning movement about a vertical axis,
    crane means for disposition atop said opened-top shell to raise and lower the aforesaid enclosure-means-supporting swivel means, and
    turning means operable from said enclosure means when suspended within said shell, to effect the aforesaid turning movement.

2. Work station apparatus as set forth in claim 1,
    wherein said radiation shielded enclosure means comprises a pair of enclosures disposed at opposite sides of a vertical clearanceway,
    aforesaid windows and holes face into said clearanceway, and
    said apparatus further comprises tool hoist means carried by said swivel means, for raising and lowering tools vertically through said clearanceway.

3. Work station apparatus as set forth in claim 2,
    wherein each of said enclosures is constructed and arranged to accommodate two working persons while standing upright.

4. Work station apparatus as set forth in claim 2,
    wherein each of said enclosures has an entrance door means openable to a horizontal attitude in said clearanceway.

5. Work station apparatus as set forth in claim 1,
    wherein said enclosure means is suspended by said swivel means via horizontal frame means from which the aforesaid pair of enclosures depend and with which the aforesaid tool hoist means is affiliated.

6. Work station apparatus as set forth in claim 1,
    further comprising pedestal means for supporting said crane means and for support by and extension above the top edge of an opened-top steam generator shell.

* * * * *